United States Patent
Babitch et al.

(10) Patent No.: US 8,429,086 B2
(45) Date of Patent: Apr. 23, 2013

(54) SYSTEM FOR LOCATION BASED TRANSACTION SECURITY

(75) Inventors: Daniel Babitch, San Jose, CA (US); Lionel Garin, Palo Alto, CA (US)

(73) Assignee: CSR Technology Inc., San Jose, CA (US)

( * ) Notice: Subject to any disclaimer, the term of this patent is extended or adjusted under 35 U.S.C. 154(b) by 0 days.

(21) Appl. No.: 13/010,256

(22) Filed: Jan. 20, 2011

(65) Prior Publication Data

US 2012/0191614 A1 Jul. 26, 2012

(51) Int. Cl.
*G06Q 20/00* (2012.01)

(52) U.S. Cl.
USPC .............. 705/71; 705/64; 705/16; 705/17; 705/18; 705/19; 705/20; 705/21; 705/22; 705/23; 705/24; 705/25; 705/39; 235/379; 235/380; 235/381; 235/382; 379/91.01; 379/91.02; 902/2

(58) Field of Classification Search ............... 705/71
See application file for complete search history.

(56) References Cited

U.S. PATENT DOCUMENTS

| 6,029,154 | A | 2/2000 | Pettitt | |
| 2007/0150411 | A1* | 6/2007 | Addepalli et al. | 705/39 |
| 2009/0132813 | A1* | 5/2009 | Schibuk | 713/158 |
| 2012/0086571 | A1* | 4/2012 | Scalisi et al. | 340/539.13 |

* cited by examiner

*Primary Examiner* — James A Reagan
(74) *Attorney, Agent, or Firm* — RatnerPrestia (57) ABSTRACT

A system for improving transaction security based on location information. The system includes a transaction processing center in communication with a first transaction device and a second transaction device. The transaction processing center includes a receiver that receives respective identification and location from at least one of the first and second transaction devices. The transaction processing center also includes a transaction processor that validates the identifications, validates the locations, and executes a transaction between the first and second transaction devices when the identifications and locations are validated.

16 Claims, 7 Drawing Sheets

SYSTEM FOR LOCATION BASED TRANSACTION SECURITY

The present invention relates, in general, to a system for utilizing location information about parties executing a transaction. More specifically, the present invention relates to controlling the transaction between the parties based on the location information of at least one of the parties.

BACKGROUND

In conventional transaction systems, identifications (i.e. credit/debit account information) of transaction parties are verified before a transaction is authorized. In some credit card systems, a buyer (e.g. utilizing a credit/debit card or smart card) may request to purchase goods from a seller. A transaction processing center (e.g. a clearinghouse such as VISA or MASTERCARD) may be utilized to verify the identities of the buyer and seller as well as the funds required for the purchase. For example, when the buyer swipes (i.e. a standard credit swipe or smart card swipe) the card at the card reader machine, the card information (i.e. credit/debit card number) is encrypted and transmitted to the transaction processing center. The transaction processing center then checks the database to determine if the card number is valid, and if the appropriate funds are available for making the purchase. An authorization message is sent back to the card reader machine authorizing the purchase of the products.

SUMMARY

Although the account information of the buyer and seller may be validated by conventional systems, their respective locations (i.e. where they are located as the transaction is taking place) are not considered. Thus, if a credit card number is stolen and utilized (e.g. in another state or region), the transaction may still be validated (i.e., the card number and expiration date will still be valid and the transaction will be executed).

An embodiment of the present invention provides a system for supplementing conventional transaction systems with location based security. The system may include one or more parties which determine their respective locations using a positioning system. The system may also include an authorizing party which verifies the identities (i.e. account information) of the at least one party, as well as its computed location. Based on the location of at least one of the parties, the transaction may be controlled accordingly (e.g. the transaction may be authorized, denied or restricted). It is understood that the foregoing general description and the following detailed description are exemplary, but not restrictive, of the invention.

DETAILED DESCRIPTION

As will be described, the example embodiments provide a location based transaction system for improved security. Specifically, transaction parties (e.g. buyer and seller) may be operating transaction devices (e.g. cellular phones, computers, etc.) which include one or more positioning processors (e.g. GPS Receivers) for computing the location of at least one device in the transaction. The computed location(s) are then either validated between the devices, or by an independent authorizing party (e.g. clearinghouse server device). In general, the transaction between the parties may either be authorized, denied or restricted based on the location(s) of the devices.

In one embodiment, at least one of the transaction devices may have GPS capabilities for computing its physical location. The device may send its identification information (e.g. credit/debit account information and/or device ID) as well as its computed location to a transaction processing center. The transaction processing center may either authorize the transaction as normal, deny the transaction, or allow the transaction with some restrictions. For example, if the location of a buyer device and/or seller device raises suspicion, the transaction may be denied or a monetary limit (i.e. if the transaction is a monetary transaction) may be imposed so that the buyer is restricted to making only limited purchases.

It is noted that the transaction devices may be in static locations (e.g. home computers, department store card readers, etc.) or may be in mobile locations (e.g., portable computers, cellular phones, etc.). In general, FIGS. 2-6 illustrate a monetary transaction between a buyer and seller. However, it is noted that the transaction may be monetary based (e.g. credit card purchases) or information based (e.g. document transfers). For example, the transaction may be the transmission and reception of sensitive information such as business and legal documents between a server device and a client device.

Figure 1:
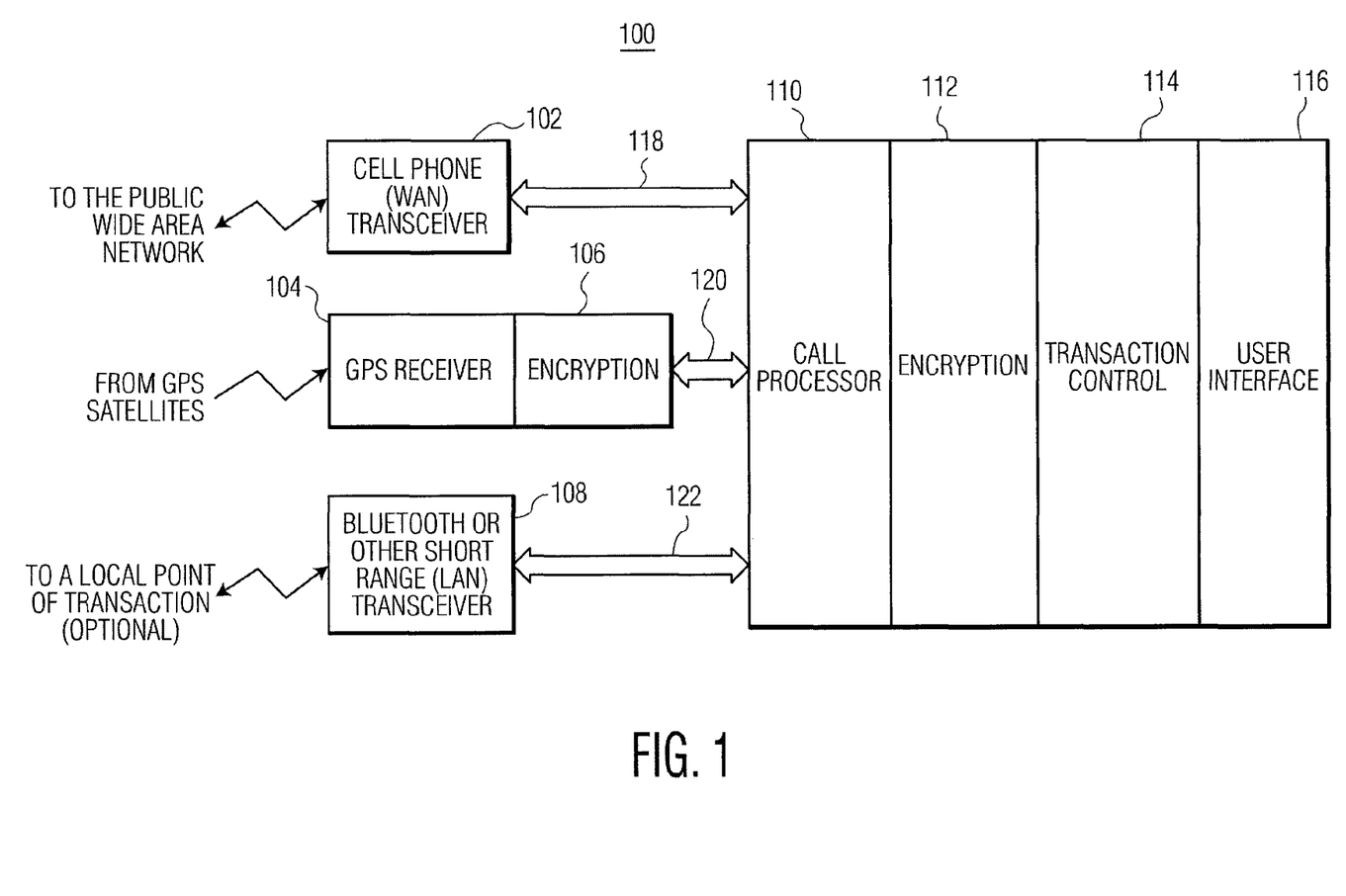
FIG. 1 is a functional block diagram of a system of a transaction device having a GPS receiver, according to an example embodiment of the present invention.

In one embodiment, as shown in FIG. 1, a transaction device 100 (e.g., a cellular phone) may include user interface 116 for inputting and outputting information to a user (i.e. party) operating the device, transaction control processor 114 for performing a transaction, encryption processor 112 for encrypting information communicated between transaction device 100 and other transaction devices, call processor 110 for interfacing with a cell phone transceiver 102, GPS receiver 104, encryption processor 106, and a short range transceiver 108. In one embodiment, the call processor is connected to the cell phone transceiver, encryption processor, and short range transceiver through data lines 118, 120 and 122.

In general, one or both of the devices performing a transaction (i.e., a buyer device and/or a seller device) may have hardware similar to the hardware shown in FIG. 1. In one example, a user (e.g. a buyer) may request a transaction through user interface 116. Transaction controller 114 then instructs GPS receiver 104 to compute the location of transaction device 100. Transaction controller 114 then sends identification information and the computed location of transaction device 100 to another transaction device (e.g. a seller) or an authorizing device (e.g. a clearinghouse server) through cell phone transceiver 102 or short range transceiver 108. The seller may verify the location information provided by the buyer (e.g. by viewing the buyer's location on a map, checking the buyer's location against known locations, receiving an image of the buyer at his/her location, etc.), or may perform a similar procedure by sending its position information to the buyer or to the clearinghouse. Once the identities, account information, and locations of the transaction parties are verified (either between the parties or with the aid of the clearinghouse), the transaction may be authorized. The buyer and/or seller may authorize the transaction, for example, by activating a key on the cell phone, pressing a location on a touch pad, or indicating acceptance via a gesture such as a spoken word or a motion that is received and interpreted by the cell phone, for example, by the camera and/or microphone of the cell phone. This authorization by one or both of the parties may or may not be required to complete the transaction.

It is noted that although transaction device 100 shown in FIG. 1 utilizes a GPS receiver to compute its location, that the location may be computed by other methods. Specifically, locations of the parties may be computed based on communication signals and parameters such as GPS signals (with our without network aiding), cell location, receive/transmitted signal power, etc.

It is also noted that identification information may be selected based on the type of transaction being executed, and/or the type of device executing the transaction. In a credit card transaction, for example, an account number, a pin number (i.e., password), a security code or a combination may be utilized as the identification information. In a smart card transaction, for example, a device ID (e.g. radio frequency (RF) tag identifier) may be utilized. In a cell phone based transaction, for example, a telephone number, an ID stored on the cell phone (e.g. a SIM card ID), or an ID typed into the phone may be utilized. It is also contemplated that biometrics (e.g. fingerprint scan, voice recognition, iris scan, etc.) may be utilized.

Figure 2:
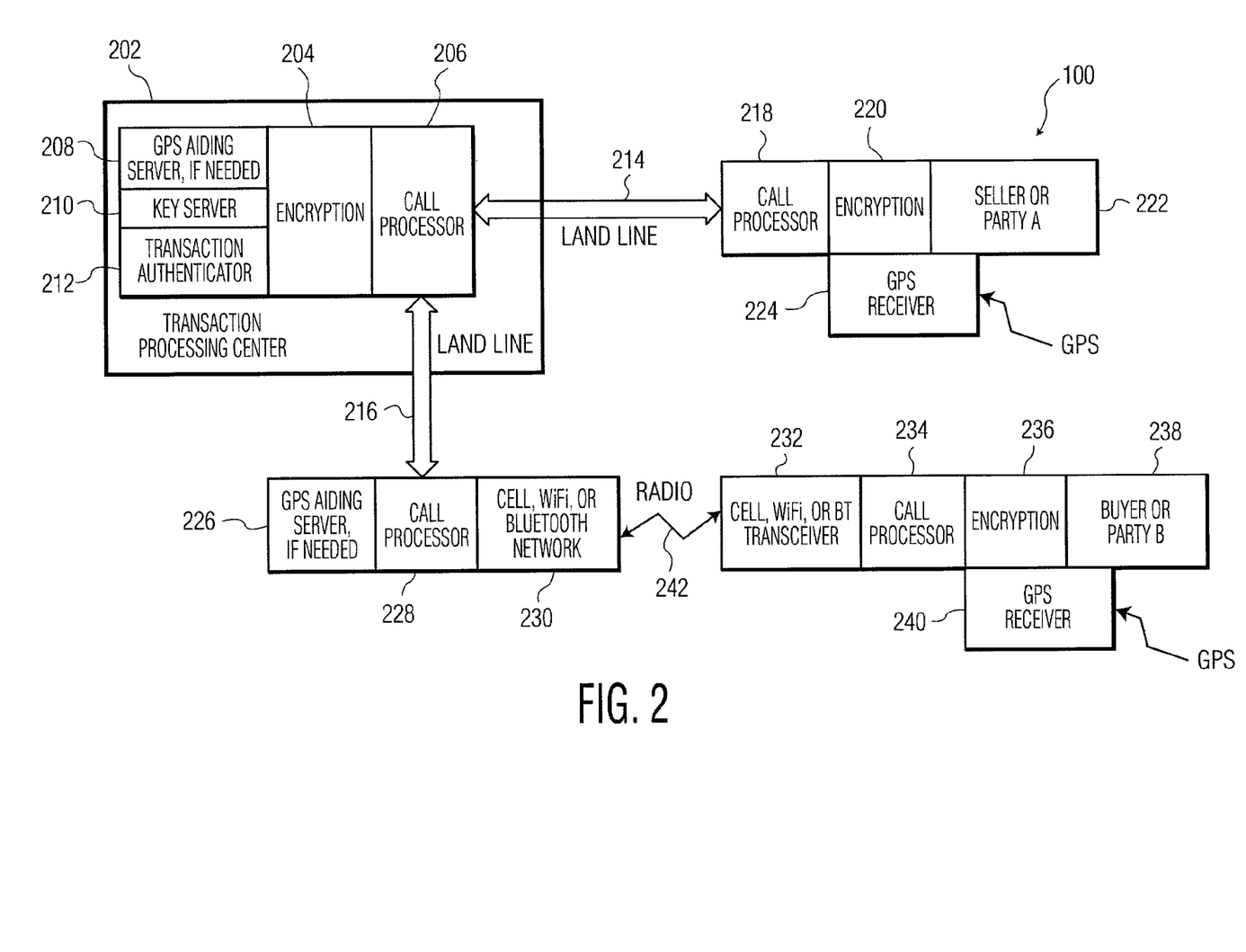
FIG. 2 is a functional block diagram of a system in which a first party and a second party perform a transaction through a transaction processing center, according to an example embodiment of the present invention.

FIG. 2 shows an embodiment of a system for performing a two party transaction including transaction device 222 (i.e. seller) and transaction device 238 (i.e. buyer). The system also includes an authorization device for authorizing a transaction (i.e. transaction processing center 202).

Before transactions are executed, key server 210 establishes encryption keys with both the buyer and the seller devices. These keys may be used to set up a virtual private network (VPN) to allow the encryption/decryption of sensitive information between the transaction processing center, buyer device and seller device. In general, encryption/decryption is performed by encryption processors 204, 220 and 236, respectively.

In one example, buyer device 238 may request to purchase a product from seller device 222. The buyer device may compute its current location with a GPS receiver 240 with or without the aid of GPS aiding devices 226 and 208 (i.e. network aided GPS). The current location of the buyer device, a time stamp and identification information computed by an identification processor (not shown) may be encrypted by encryption processor 236 and then transmitted to cell network 230 via call processor 234 and transceiver 232. It is noted that the transceiver may be a cellular transceiver or a short range receiver such as a WIFI, Bluetooth or any other transceiver or transmitter capable of sending the encrypted information. The encrypted information is sent through radio link 242, received by cell network 230 and transferred to transaction processing center 202 via call processor 228. Transaction processing center 202 receives the encrypted information over land line 216 where it is received by call processor 206 and decrypted by encryption processor 204.

Similarly, seller device 222 may compute its location through GPS receiver 224, encrypt its location, process a time stamp and identification information through encryption processor 220, and transmit the encrypted information through call processor 218 over land line 214. Thus, transaction processor center 202 receives the locations, time stamps and identification information of both the buyer device and the seller device. This information may then be sent to transaction authenticator 212 where an authentication process is preformed. It is noted that both locations of both transaction devices are not always used. In some examples only the location of one of the transaction devices (e.g. the buyer) may be used.

Transaction authenticator 212 may, for example, verify the identification information received from just the buyer device, or both the buyer device and seller device. Transaction authenticator 212 may also analyze the locations and time stamps of the buyer and seller devices. For example, locations of the buyer and seller devices may be compared to known valid/invalid locations stored in the database, while the time stamps may be compared to a known clock. Transaction authenticator 212 may then either authorize a transaction between buyer 238 and seller 222, deny the transaction, or place restrictions on the transaction.

For example, buyer 238 may make a legitimate transaction at 2 PM in Philadelphia, Pa. The buyer's credit card information may then be stolen by an unauthorized party located in Los Angeles, Calif. The unauthorized party may then pose as buyer 238 to unlawfully purchase goods from seller 222 at 3 PM. However, upon receiving the computed location and time stamp of the unauthorized party, transaction processing center 202 may deny the transaction (i.e., it is not possible for the buyer 238 to have traveled from Philadelphia, Pa. to Los Angeles, Calif. in 1 hour). Thus, transaction processing center can assume that the credit card information of the buyer has been stolen based on the comparison between the buyer's previous location/time stamp and current location/time stamp.

In another example, buyer 238 may travel with his or her cellular phone (i.e. the transaction device) from Philadelphia, Pa. to Los Angeles, Calif. while on vacation. If the buyer 238 attempts to make a purchase in Los Angeles, Calif., the purchase may still be authorized (i.e. if the time stamp information does not raise suspicion) or possibly restricted to a certain monetary amount. Specifically, transaction processing center 202 may realize that buyer device 238 is no longer at its normal location (i.e. Philadelphia, Pa. area) and use this information to control the transaction with seller device 222.

A similar process may be performed with seller device 222. Specifically, if seller device 222 should normally be located in Philadelphia, Pa., but its computed location indicates New York, N.Y., then the transaction processing center 202 may also deny the transaction.

If the buyer and seller devices are a fixed terminals connected over a land line, then their computed locations may be compared to valid locations stored in a database at transaction processing center 202. However, if the buyer or seller devices are mobile terminals, then their computed locations may be analyzed by transaction processing center 202 to determine if their locations are within an approximate range of valid/invalid locations.

Figure 3:
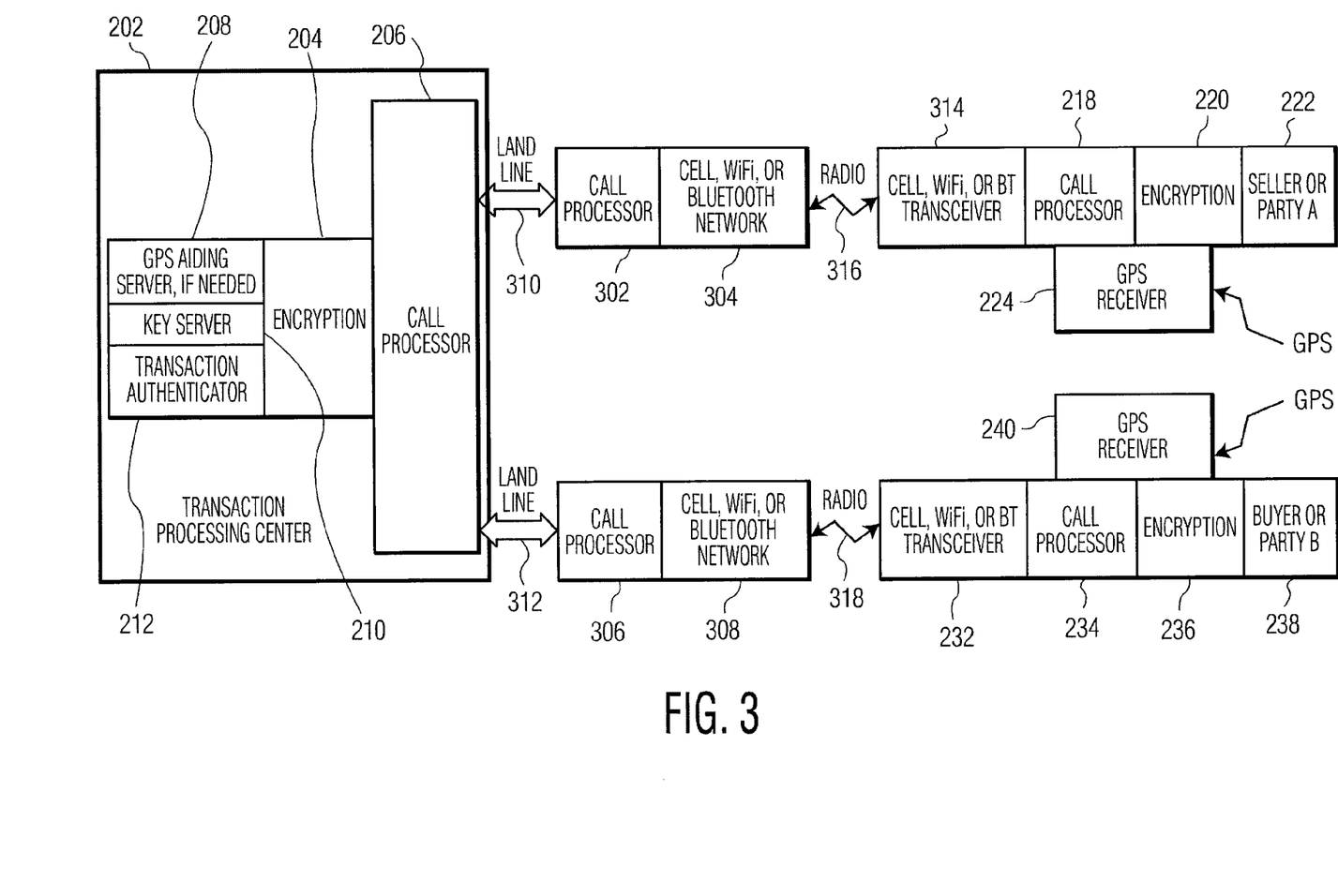
FIG. 3 is another functional block diagram of a system in which a first party and a second party perform a transaction through a transaction processing center, according to an example embodiment of the present invention.

FIG. 2 shows an example where the seller device is a fixed terminal and buyer device 238 is a mobile terminal (i.e. a cell phone). FIG. 3, however, shows another embodiment where both buyer 238 and seller 222 are mobile terminals (i.e. cellular phones or other wireless devices such laptop computers with WIFI capabilities). In this embodiment, both seller device 222 and buyer device 238 transmit their communications via radio links 316 and 318, to cellular networks 304 and 308 respectively. Cellular networks 304 and 308 interact with transaction processing center 202 via call processors 302 and 306 and land lines 310 and 312.

In general, the operation of the example system shown in FIG. 3 is similar to that of FIG. 2. Specifically, at least one of buyer device 238 and seller device 222 computes and transmits its respective location along with identification information and a time stamp to transaction processing center 202. Transaction processing center 202 then either authorizes, restricts or denies the transaction between the buyer and seller.

Figure 4:
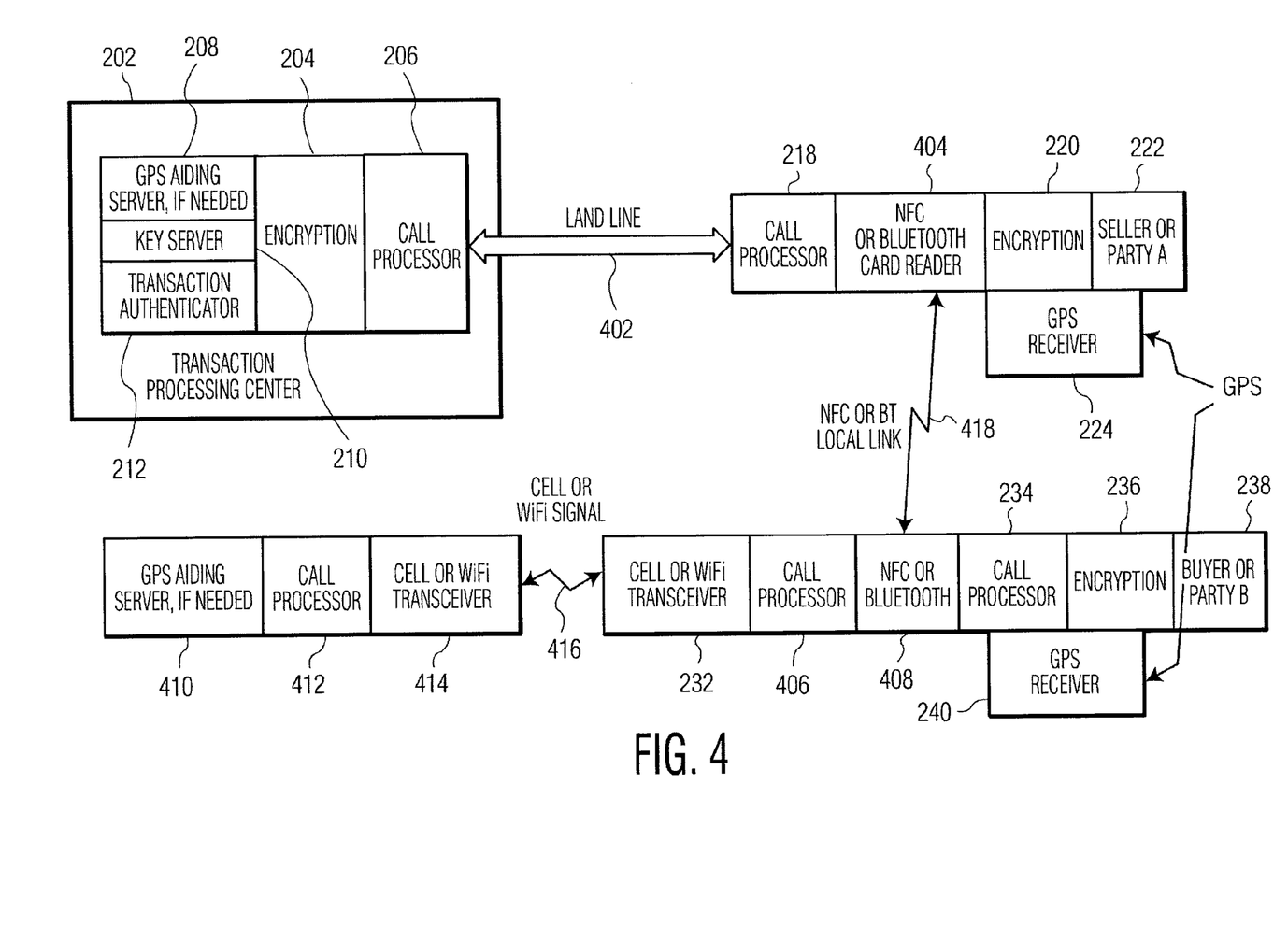
FIG. 4 is a functional block diagram of a system in which a first party and a second party perform a transaction at a transaction processing center, where the second party relays information to the transaction processing center through the first party, according to an example embodiment of the present invention.

FIGS. 2 and 3 show two different examples where the buyer and the seller devices are remotely located with respect to each other (i.e. the buyer and seller did not have direct communication with each other). FIG. 4, however, shows another embodiment where buyer device 238 and seller device 222 are located local to each other (i.e. the buyer and seller perform direct communication through short range transmission link 418).

For example, buyer device 238 (e.g. a cellular phone with smart card capabilities) may initiate a purchase of goods in a department store. The department store (i.e. seller 222) may include a smart card reader 404 which wirelessly receives the buyers information and forwards that information to the transaction processing center (i.e. the buyer sends the information to the seller, and then the seller forwards the information to the transaction processing center).

For example, buyer device 238 (i.e. a cellular phone held by a user in a department store) may compute its location (i.e. with or without the aid of a cellular network 410, 412 and 414). The location of the buyer, identification information of the buyer and the time stamp may be encrypted as described above and sent directly to a smart card reader 404 via a local wireless link 418 (i.e. cellular phone directly communicates with the card reader in order to request a transaction). Card reader 404 then forwards the buyer's encrypted information along with the seller's encrypted information (i.e. the seller's location information and identification) to transaction processing center 202 via land line 402. If the transaction is authorized, the transaction processing center credits the seller's bank account with the monetary amount agreed upon and debits that amount from the buyer's bank account (i.e. charge the amount for the goods to the buyers credit card or directly deduct it from their bank account in case of a debit transaction).

In another example, the seller device (i.e. smart card reader) may compute its own location (e.g. through a GPS receiver) to verify that it has not been moved to an unauthorized location. In another example, if the seller device does not have positioning capabilities (e.g. does not have a GPS receiver), the seller device may poll other mobile devices in the local area for location information.

Figure 5:
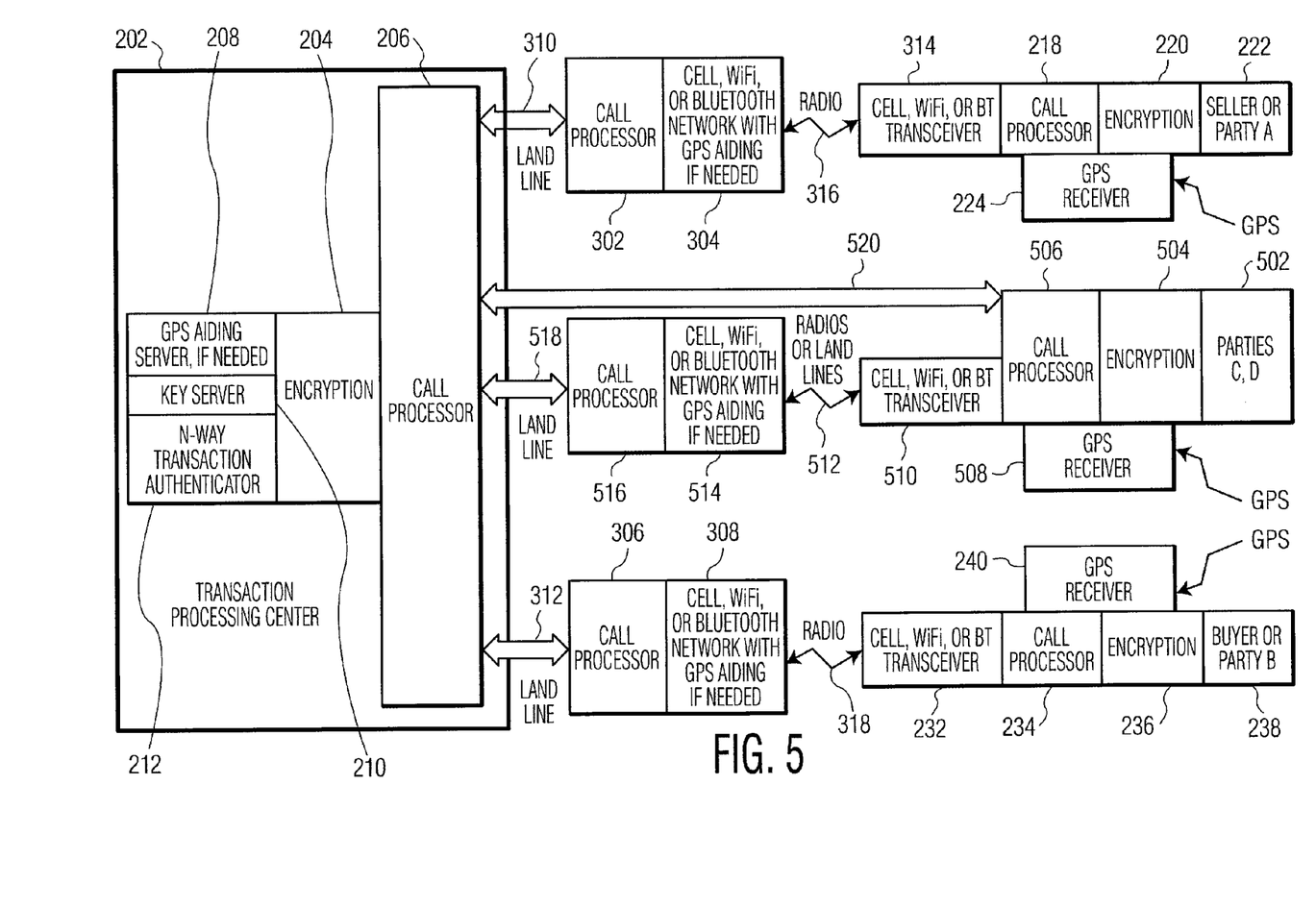
FIG. 5 is a functional block diagram of a system in which more than two parties perform a transaction through a transaction processing center, according to an example embodiment of the present invention.

FIGS. 2, 3 and 4 show example systems for transactions between two parties (i.e. a buyer device and a seller device). FIG. 5, however, shows a transaction between more than two parties (i.e. transaction devices A, B, C, D . . . etc.). Additional transaction devices C, D, . . . , etc, have identification processors, encryption processors 504, call processors 506, GPS receivers 508, and transceivers 510. These parties similarly communicate over radio links or land lines to networks 514 which are interfaced through land lines 518 and 520 to the transaction processing center 202.

FIG. 5, may be an example of two buyers (i.e. buyer device 238 and buyer device 502 which may be purchasing an item from seller device 222). Specifically, both buyer devices 238 and 502 may be partially paying for the product provided by the seller (i.e. buyer device 238 and device 502 may be each paying 50% of amount of the product). In another example, buyer device 238 and buyer device 502 may be bidding on a product of seller device 222 (i.e. an auction environment).

In general, seller device 222, buyer device 502 and buyer device 238 may compute their respective locations, encrypt and transmit those locations along with identification information and time stamp information to transaction processing center 202. As previously described, the transaction processing center may then either authorize, deny or restrict the transaction between or among the transaction devices.

In FIGS. 2, 3, 4 and 5, transactions between two or more parties have been authorized by a trusted transaction processing center (an authorizing party). In some instances, an authorizing party may not be necessary or may not be available for the transaction. Thus, a method for executing a transaction without a transaction processing center may be beneficial.

Figure 6:
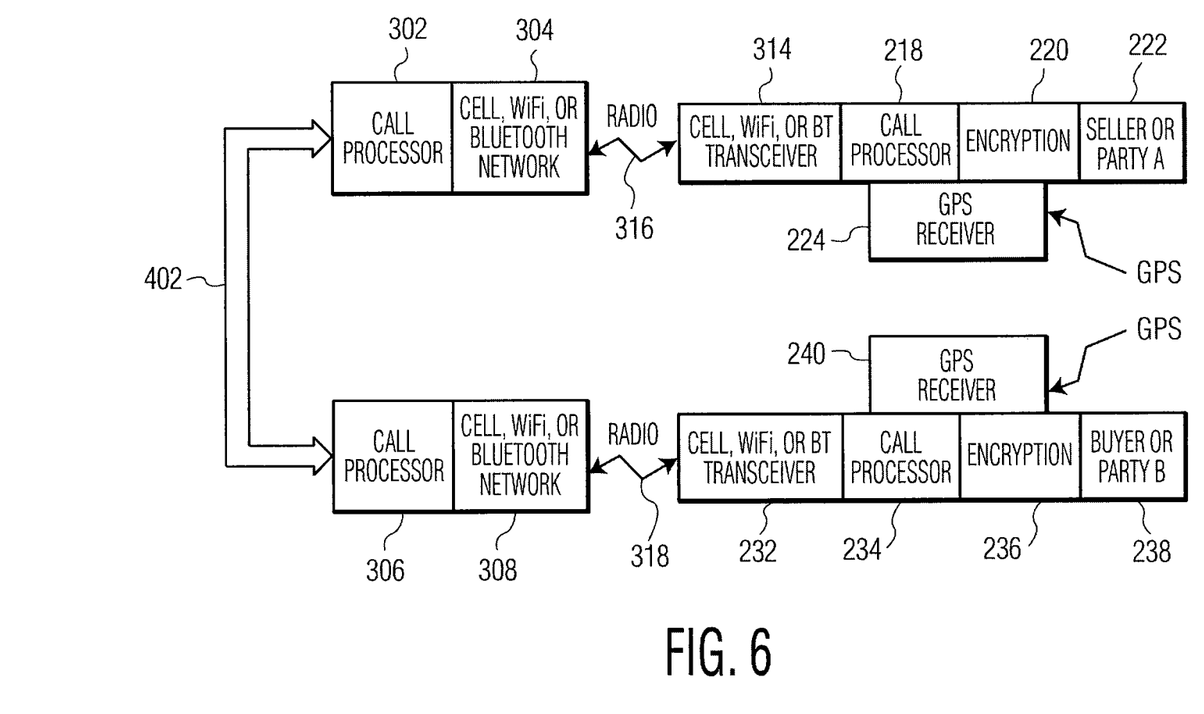
FIG. 6 is another functional block diagram of a system in which a first party and second party perform a transaction without the aid of a transaction processing center, according to an example embodiment of the present invention.

Shown in FIG. 6 is another embodiment where a seller device 222 and buyer device 238 perform a transaction between each other without the aid of transaction processing center 202. Specifically, buyer device 238 computes and transmits (for example, via land line 402) its location to seller device 222. Similarly, seller device 222 computes and transmits its location to buyer device 238. Thus, seller device 222 and buyer device 238 send their respective locations, identification information, and time stamp information to each other.

Upon receiving the other parties information, a mutual authorization may be performed. Specifically, seller device 222 may either authorize, restrict or deny the transaction based on the buyer information. Similarly, the buyer may either authorize, restrict or deny the transaction based on the seller information. It is contemplated, that only one of the transaction devices (e.g. buyer or seller) may send its location information to the other transaction device.

Figure 7:
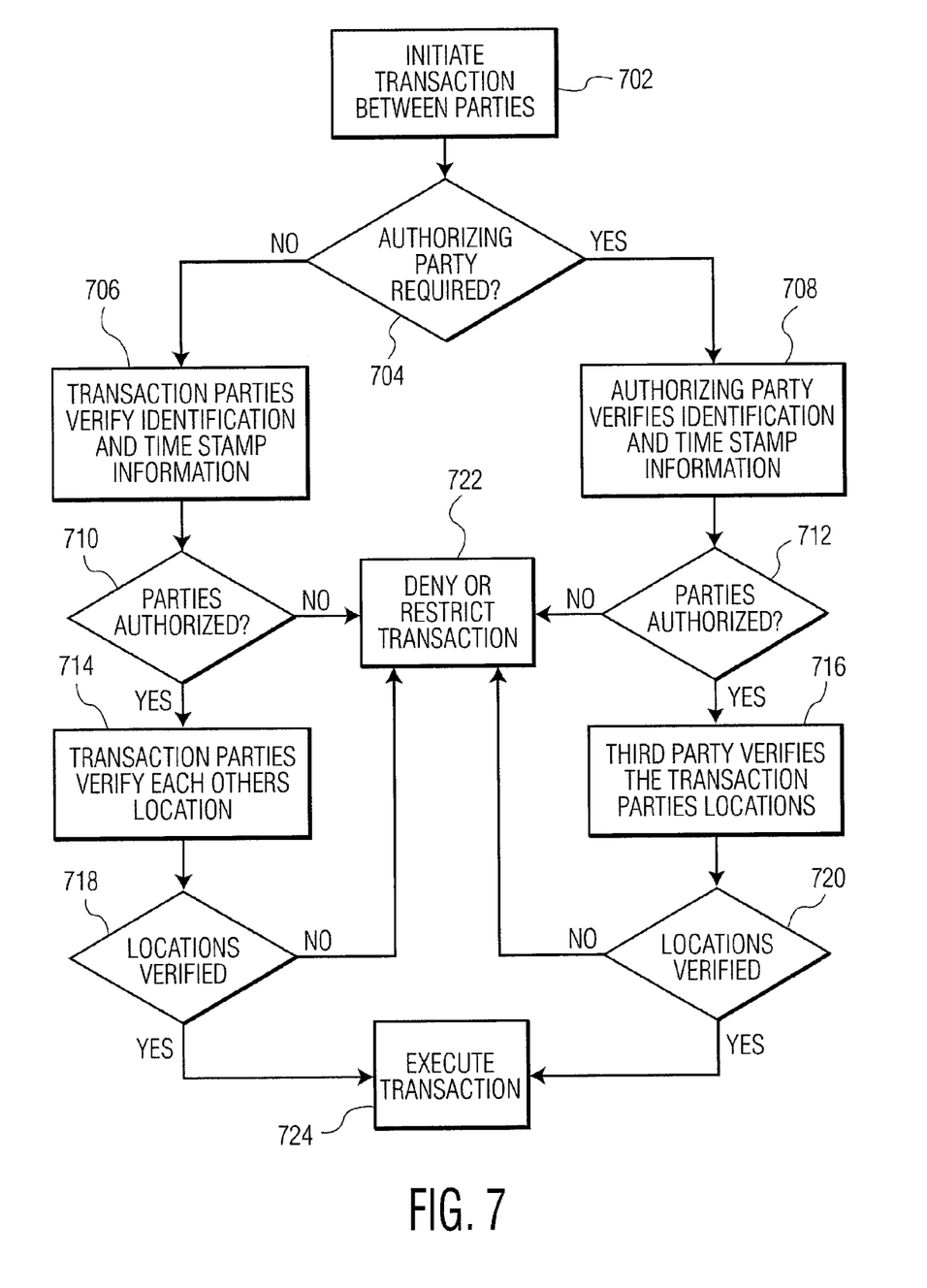
FIG. 7 is a flow chart describing the initiation and execution of a transaction between two or more parties, according to an example embodiment of the present invention.

Shown in FIG. 7 is a flow chart describing the transaction process between two or more parties. Specifically, two or more parties initiate a transaction (step 702). The parties determine if an authorizing party such as a transaction processing center is required (step 704). If an authorizing party is not required, then the transaction parties mutually exchange location (e.g. buyer sends location to seller or both buyer and seller send locations to each other) and identification information between each other (step 706). Finally, if an authorizing party is required, then at least one of the transaction parties transmits its respective location and identification information to the authorizing party for authorization (step 708).

In either example, it is determined whether the parties identifications are authorized (step 710 and step 712). If the identities of the parties are not authorized, then the transaction may be denied or restricted (step 722). Further, if the identities of the transaction parties are authorized, then the respective location(s) of the parties may be verified (step 714 and step 716). If the location(s) of the parties are not verified (step 718 and step 720), then the transaction may be denied or restricted. However, if the location(s) are verified, then the transaction may be executed (step 724). Although the flow chart shows the identifications being authorized before their location(s), this is not necessary (the location(s) may be authorized before their identifications and time stamps).

Although FIGS. 2, 3, 4, 5 and 6 show transactions being executed between a buyer and seller, it was previously noted that other transactions may be executed (i.e. non-monetary transactions). For example, buyer device 238 in FIG. 3 may be a client device requesting a download of sensitive documents from seller device 222 which may be a document server. Thus, the client device and the server may compute their respective locations/time stamps, and transmit them to the transaction processing center. Upon receiving the information, the transaction processing center may either authorize, deny or restrict the transaction. In general, the client device may be protected by ensuring that the proper documents are downloaded from the proper server. The server device may also be protected so that sensitive documents are not distributed to an unlawful downloader. In general, the transaction system described in this application can be applied to any type of transaction where the locations of the transaction parties are beneficial to improving the security of the system.

In some examples, unauthorized parties with illegal intentions may try and transmit a fake location to the transaction processing server, or try and fool the GPS receiver by broadcasting fake GPS signals (GPS spoofing by a GPS simulator). This potential problem may be mitigated by also transmitting other data included in the GPS signal such as encrypted military messages, which, appear to be unpredictable random bits. Spoofing these bits would require a sophisticated GPS simulator that retrieves the bits from the actual GPS signal (e.g. an unauthorized GPS receiver located near the transaction party would have to receive and forward the military bits to the spoofing device).

Therefore, when the transaction processing center compares the bits captured by the transaction device, with the bits received by the transaction processing center or other parties able to receive the military messages transmitted from the satellite (i.e. accounting for a time stamp difference due to position difference), they would fail to match and the transaction may be denied. In this embodiment, the transaction device(s) relay the pseudo random military message and time stamp to the transaction processing center so that it may be verified that the buyer and seller are actually in the location(s) that they say they are.

It is noted that data other than the military message may also be utilized to protect against spoofing. For example, almanac data received from the satellite, or Doppler data computed based on the received satellite signal may also be utilized (i.e. a comparison may be made with valid almanac and Doppler data) to confirm the actual location of the device.

In another example, a call back procedure may also be utilized to verify locations of the transaction parties. For example, a buyer device may transmits its location to the transaction processing center. The transaction processing center may then transmit a unique message through a cellular tower or other short range transmitter at the buyers claimed location. If the buyer device is able to receive and forward the unique message back to the transaction processing center, then buyer device location is verified. If the buyer device, however, cannot receive the message (i.e. the buyer device is not located where they claimed to be located), then the transaction processing center may deny the transaction.

Another benefit to the system is that the transaction center could issue new encryption keys at any point in time instantaneously. This is an improvement over the current process of mailing credit cards and calling for activation. This process is presently done once a year, but with the above described methods and apparatuses, it could be done wirelessly and as often as desired which would improve the overall transaction security system. It is also contemplated that the military bits in the GPS signal may be utilized as an encryption/decryption key. If these bits were selected from the GPS satellite signal according to known key generation protocol, there may be no need to exchange keys.

In general, there may be a hierarchy of security levels with each level having restrictions on its transaction use. For example, if the user device is in a location where it cannot receive GPS signals, it may be possible to have a time stamp of moderate accuracy based on a real time clock which indicates the duration since the last previous GPS fix and therefore the maximum clock error. In such circumstances, the transaction center may still allow the transaction with restrictions. This system would then balance the required security against potential loss per transaction.

In either of the embodiments described above, the transaction parties are authenticated not solely based on their identification, but also their location and time stamp information. This provides an improved security system when two or more parties are attempting to perform a transaction.

It is noted that the apparatuses and methods described above may be implemented in either hardware, software, or a combination of hardware and software. For example, performing GPS reception, cell phone/short range transmission/reception, and call processing may be implemented in hardware (e.g. dedicated hardware circuits, reconfigurable hardware circuits such as Field Programmable Gate Arrays (FPGAs), Application Specific Integrated Circuits (ASICs), etc.). Performing information encryption/decryption, device/account identification, transaction execution, and key distribution may be implemented as software running on a processor (e.g. microprocessor, microcontroller, etc.).

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A system for improving transaction security, comprising:
   a first transaction device including:
      an identification processor for determining a first identification of the first transaction device,
      a positioning processor for determining a first location of the first transaction device,
      a transmitter for transmitting the first identification and the first location to a second transaction device,
      a receiver for receiving a second identification and a second location of the second transaction device,
      a transaction processor for executing a transaction with the second transaction device responsive to:
         an authorization being received from the second transaction device indicating that the first identification and the first location are validated by the second transaction device, and an authorization being transmitted to the second transaction device indicating that the second identification and the second location are validated by the first transaction device.

2. The system of claim 1, wherein
the first transaction device includes a receiver for receiving a second identification and a second location of the second transaction device, and
the transaction processor is configured to authenticate the second identification and the second location before executing the transaction.

3. The system of claim 1, wherein
the second transaction device is configured to validate the first transaction device by comparing the first identification and the first location to known identifications and locations stored in a database.

4. The system of claim 1, wherein
the system includes the second transaction device and the second transaction device is configured to deny the transaction when the second transaction device determines the first location to be invalid based on a database of invalid locations.

5. The system of claim 1, wherein
the first transaction device and second transaction device are configured to generate respective encryption keys for encrypting/decrypting the identification and location information before transmitting the information to each other.

6. The system of claim 1, wherein
the first transaction device and second transaction device are cellular phones configured to mutually authenticate each other based on location information communicated through a cellular network.

7. The system of claim 1, wherein
the system includes the second transaction device and at least one of the first and second transaction devices including means for authorizing the transaction.

8. A system for improving transaction security, comprising:
a first transaction device including:
an identification processor for determining a first identification of the first transaction device,
a positioning processor for determining a first location of the first transaction device,
a GPS receiver for receiving GPS data from a GPS satellite,
a transmitter for transmitting the first identification, the first location and the GPS data to a second transaction device,
a transaction processor for executing a transaction with the second transaction device responsive to:
the second transaction device authorizing the first transaction device by comparing the GPS data received from the first transaction device with other GPS data received by a GPS receiver from the GPS satellite at the second transaction device.

9. The system of claim 8, wherein
the GPS data and the other GPS data include an encrypted military message transmitted from the GPS satellite.

10. A system for improving transaction security, comprising:
a first transaction device and a second transaction device;
the first transaction device including:
an identification processor for determining a first identification of the first transaction device,
a positioning processor for determining a first location of the first transaction device,
a transmitter for transmitting the first identification and the first location to the second transaction device,
a transaction processor for executing a transaction with the second transaction device,
the second transaction device including:
an identification processor for determining a second identification of the second transaction device,
a positioning processor for determining a second location of the second transaction device,
a transmitter for transmitting the second identification and the second location to the first transaction device,
a transaction processor for executing a transaction with the first transaction device,
wherein the transaction is executed in response to a) the first identification and the first location being validated by the second transaction device, and b) the second identification and the second location being validated by the first transaction device.

11. The system of claim 10, wherein
the first transaction device and the second transaction device are cellular phones including respective GPS receivers for computing the first location of the first transaction device, and a second location of the second transaction device.

12. The system of claim 10, wherein
the first transaction device is a buyer transaction device and the second transaction device is a seller transaction device, and
the transaction is the first transaction device purchasing goods from the second transaction device.

13. The system of claim 10, wherein
the first transaction device is a client and the second transaction device is a server, and
the transaction is the first transaction device downloading data from the second transaction device.

14. The system of claim 10, wherein
the first transaction device transmits the first identification and first location to the second transaction device, and
the second transaction device forwards the first identification and first location to a transaction processing center.

15. The system of claim 10, wherein
the first transaction device and second transaction device compute their respective locations based on respective GPS receivers aided by a transaction processing center through the network.

16. The system of claim 10 wherein
the first transaction device includes means for authorizing the transaction.

* * * * *

UNITED STATES PATENT AND TRADEMARK OFFICE
CERTIFICATE OF CORRECTION

PATENT NO.        : 8,429,086 B2
APPLICATION NO.   : 13/010256
DATED             : April 23, 2013
INVENTOR(S)       : Babitch et al.

It is certified that error appears in the above-identified patent and that said Letters Patent is hereby corrected as shown below:

In the Specification

Column 3, Line 36, delete "(with our" and insert -- (with or --, therefor.

Column 4, Lines 25-26, delete "preformed." and insert -- performed. --, therefor.

Column 5, Line 4, delete "are a fixed" and insert -- are fixed --, therefor.

Column 5, Line 43, delete "buyers" and insert -- buyer's --, therefor.

Column 5, Line 62, delete "buyers" and insert -- buyer's --, therefor.

Column 6, Line 47, delete "parties" and insert -- party's --, therefor.

Column 7, Line 63, delete "transmits" and insert -- transmit --, therefor.

Column 7, Line 66, delete "buyers" and insert -- buyer's --, therefor.

Signed and Sealed this
Thirty-first Day of December, 2013

Margaret A. Focarino
*Commissioner for Patents of the United States Patent and Trademark Office*